United States Patent [19]
Dielhof

[11] Patent Number: 4,965,671
[45] Date of Patent: Oct. 23, 1990

[54] PICTURE PICK-UP DEVICE INCLUDING A SOLID-STATE SENSOR AND AN ELECTRONIC SHUTTER OPERATING WITH A MINIMUM AND MAXIMUM NUMBER OF RESET PULSES

[75] Inventor: Pieter B. Dielhof, Eindhoven, Netherlands

[73] Assignee: U.S. Philips Corp., New York, N.Y.

[21] Appl. No.: 204,648

[22] Filed: Jun. 9, 1988

[30] Foreign Application Priority Data

Jun. 26, 1987 [NL] Netherlands ............ 8701498

[51] Int. Cl.[5] .................. H04N 3/15; H04N 5/235
[52] U.S. Cl. .................. 358/213.13; 358/213.19; 358/213.24
[58] Field of Search .............. 358/213.13, 213.15, 358/213.19, 213.24, 213.25

[56] References Cited
U.S. PATENT DOCUMENTS 3,931,463  1/1976  Levine ................ 357/24
4,032,976  6/1977  Levine ................ 358/213.24
4,769,709  9/1988  Van De Steeg ........ 358/213.19

Primary Examiner—James J. Groody
Assistant Examiner—Robert M. Bauer
Attorney, Agent, or Firm—Marianne R. Rich

[57] ABSTRACT

In the construction of the sensor as a frame transfer sensor (FT) a control circuit therefor may not only be utilized for the information transfer and the electronic shutter, but also for a third purpose, namely for a reduction of the smear before integration. Starting from the control circuit for an information frame transfer ($\phi_A$, TG, $\phi_B$), a parallel information shift ($\phi_B$, TG) and a serial information shift ($\phi_C$) at the sensor and the electronic shutter (ESPS, BUF, MF, $\phi_A$) at a pick-up member (PP) of the sensor (FT), the smear reduction is obtained by the use of a pulse generator (JC, FF, AN, I) at the electronic shutter, which generator is adapted to supply a series of reset pulses (ESPS) with a minimum number. A minimum number of two line-frequency pulses occurring in line blanking periods has been given as an example.

6 Claims, 3 Drawing Sheets

4,965,671

PICTURE PICK-UP DEVICE INCLUDING A SOLID-STATE SENSOR AND AN ELECTRONIC SHUTTER OPERATING WITH A MINIMUM AND MAXIMUM NUMBER OF RESET PULSES

BACKGROUND OF THE INVENTION

The invention relates to a picture pick-up device including a solid-state sensor and an electronic shutter, which sensor comprises a picture pick-up member including a matrix of picture pick-up elements, a storage member coupled thereto including a matrix of storage elements and a parallel-in, series-out shift register member coupled thereto including at least one row of shift register elements which is coupled to a picture signal output of the sensor for supplying a picture signal occurring at line scanning periods, line blanking periods, field scanning periods and field blanking periods, said sensor to this end being coupled to a control circuit for supplying control signals for obtaining, after an effective picture information integration period at the pick-up member, a parallel information frame transfer effected in a frame transfer period from the picture pick-up member to the storage member during a field blanking period and for subsequently obtaining a periodically occurring parallel information shift effected during a line blanking period from the storage member to the shift register member in which a serial information shift to the picture signal output is subsequently effected during a line scanning period, the electronic shutter operating with a periodical resetting during a variable part of the maximum available picture information integration period at the picture pick-up member with the aid of a series of reset pulses occurring during line blanking periods and to be supplied by a pulse generator which is present in the control circuit.

A picture pick-up device of this type is known from British Patent Application 2,160,060. The sensor shown is of the so-called frame transfer type in which rectangularly shaped matrices of the pick-up member and the storage member are each formed with elements arranged in rows and columns and the information transfer is effected in the column direction. The electronic shutter is controlled via the control circuit with reference to a maximum admissible picture signal value. It has been shown that the series of reset pulses is composed of a burst of three reset pulses per line blanking period, which pulses have a period of one microsecond.

SUMMARY OF THE INVENTION

In the application of the combination of the described sensor and electronic shutter in a picture pick-up device, the invention has for its object to utilize this shutter for a further purpose. To this end a picture pick-up device according to the invention is characterized in that the said pulse generator is adapted to supply a minimum number of reset pulses independent of the duration of the variable part of the period with the periodical resetting. Consequently a resetting at the pick-up member is effected each time at the commencement of each picture information integration period. The result is an elimination of interference from the picture pick-up elements, which interference has remained after the previous information frame transfer between the picture pick-up member and the storage member. If this interference is not eliminated from the picture signal to be reproduced, signal smear occurs in the displayed picture. This signal smear may be indicated as smear before integration which together with smear after integration produced at the own information frame transfer leads to smear upon display. The picture signal comprises the signal smear component because the picture pick-up elements continue the information integration during the periodical frame transfer. As an example of a smear reduction after integration reference is made to U.S. Pat. No. 4,567,524 in which information about smear after integration is obtained by using a longer continuing frame transfer than is required for the information transfer. Consequently the sensor pick-up member operates, as it were, with at least one "empty" row of pick-up elements from which only the smear information emanates which contains the smear-after-integration component only. According to the present invention the smear-before-integration component can be eliminated via the electronic shutter adaptation.

To realize a minimum possible picture information integration period an embodiment of a picture pick-up device according to the invention is characterized in that the said pulse generator for supplying the minimum number of reset pulses is further adapted to supply a maximum number of reset pulses, which maximum number occurs in a period which is shorter than the maximum available picture information integration period minus the frame transfer period. The said pulse generator for supplying the minimum number of reset pulses can be simply adapted to supply the maximum number.

A simple picture pick-up device in which the control circuit is formed with a field-frequency sawtooth generator an output of which is coupled to an input of a signal comparison circuit having another input for the supply of a control voltage determining the effective picture information integration period and having an output coupled to an input of the said pulse generator for supplying the series of reset pulses is characterized in that the pulse generator includes a flip-flop circuit having a data input which is coupled to an output of the said signal comparison circuit, a clock input for the supply of a first line-frequency clock pulse signal and an overriding set input which is coupled to an output of a field-synchronised line-frequency pulse counting circuit, an output of the flip-flop circuit being coupled to an input of a coincidence circuit having another input for the supply of a second line-frequency clock pulse signal and an output for the supply of the said series of reset pulses.

A further embodiment for supplying the maximum number of reset pulses is characterized in that the flip-flop circuit has an overriding clear input which is coupled to an output of the field-synchronised line-frequency pulse counting circuit.

An embodiment in which the periodical resetting is effectively performed in practice at the picture pick-up member of the sensor and in which the control circuit includes a time signal generator having outputs for the supply of clock pulse signals, which outputs are coupled via a gating circuit to the picture pick-up member of the sensor and an input of the gating circuit is coupled to an output of the pulse generator for the supply of the series of reset pulses is characterized in that the gating circuit includes a buffer circuit for each gating input and output for the clock pulse signals, which buffer circuits are blocked under the control of the series of reset pulses during line blanking periods, whilst simultaneously the output of each buffer circuit is connected via an on-off switch to a reference voltage for the resetting at the picture pick-up member of the sensor.

The invention will now be described in greater detail with reference to the accompanying drawings.

DETAILED DESCRIPTION OF THE PREFERRED EMBODIMENT

Figure 1:
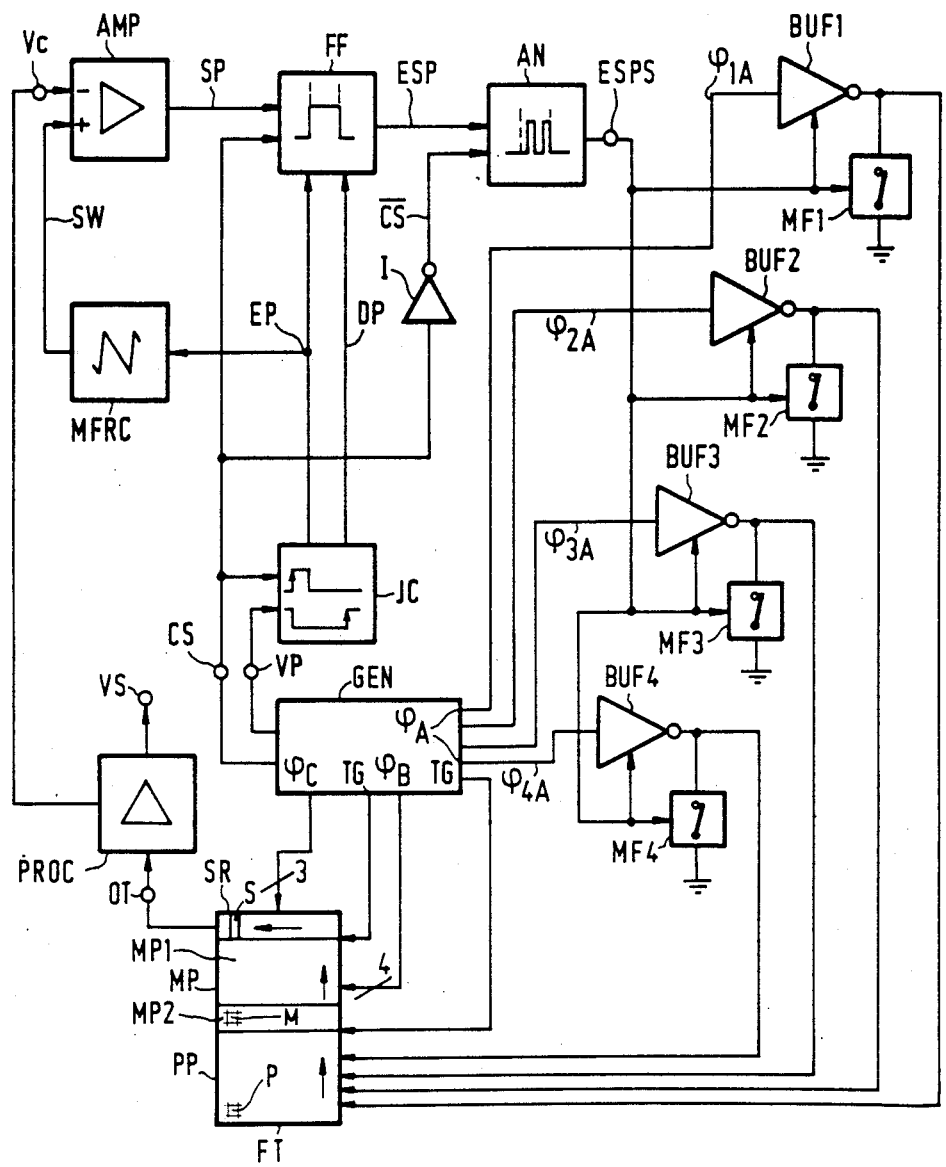
FIG. 1 is a block diagram of an embodiment of a picture pick-up device according to the invention.

In FIG. 1 the reference FT denotes a solid-state sensor in the form of a so-called frame transfer sensor in a block diagram of a picture pick-up device, The sensor FT comprises a picture pick-up member PP, a storage member MP and a parallel-in, series-out shift register member SR. The picture pick-up member PP and the storage member MP are each formed with a matrix of picture pick-up elements P and storage elements M arranged in rows and columns, respectively. For the purpose of illustrating the information processing the storage member MP is sub-divided into a member MP1 and a member MP2, assuming that the member MP2 no longer contains any information and the member MP1 still contains information to be parallel shifted to the shift register member SR. The shift register member SR is shown with at least one row of shift register elements S which is coupled to a picture signal output OT of the sensor FT. The members MP and SR are shielded from incident radiation such as light. The output OT is coupled to an input of a picture signal processing circuit PROC which has an output for the supply of a picture signal VS and an output for the supply of a control voltage Vc to be described hereinafter. The signal VS and the voltage Vc are present at terminals which have identical references. The picture signal VS occurs at line scanning periods, line blanking periods, field scanning periods and field blanking periods. The picture signal VS is suitable, for example, for a standardized or non-standardized television system, for a system using a periodical transfer of still pictures for, for example, object security purposes or facsimile, for a robot monitoring system etc. Furthermore a picture recording with quickly moving objects in the scene to be recorded is feasible.

FIG. 1 also shows a control circuit for the sensor FT whose base is formed by a time signal generator GEN. The generator GEN supplies, inter alia, control signals for the sensor FT, with clock pulse signals being denoted by $\phi$ and transfer signals being denoted to TG at identically denoted outputs. A four-phase clock pulse signal $\phi_A$ occurs at four leads $\phi_{1A}$, $\phi_{2A}$, $\phi_{3A}$ and $\phi_{4A}$ which are coupled to the picture pick-up member PP of the sensor FT. A transfer signal TG ensures a parallel information frame transfer from the picture pick-up member PP to the storage member MP. During this transfer in a frame transfer period a likewise four-phase clock pulse signal $\phi_B$ ensures the information shift in the storage member MP via four leads which have been shown as a single lead for the sake of simplicity. At the end of the frame transfer period which is present in a field blanking period of the picture signal VS, the storage member MP is filled with the picture information which was previously built up in the picture pick-up member PP in a picture information integration period because radiation such as light incident on this member is converted in this member into charge packets. After the frame transfer period the picture information integration can be effectively performed at the picture pick-up member PP while an information shift is effected in the storage member MP to the shift register member SR. Under the control of the clock pulse signal $\phi_B$ and a transfer signal TG there is a periodical, parallel information shift from the storage member MP to the shift register member SR during a line blanking period. Subsequently a serial information shift denoted by an arrow is effected in the shift register member SR under the control of a three-phase clock pulse signal $\phi_C$ during a line scanning period. Parallel information shifts at the members PP and MP are also denoted by arrows. With reference to the signals described the information frame transfer is denoted by ($\phi_A$, TG, $\phi_B$), the parallel information shift is denoted by ($\phi_B$, TG) and the serial information shift is denoted by ($\phi_C$). For a further detailed description of the operation of the sensor FT and the and the time signal generator GEN reference is made to the Philips Data Handbook "Solid-State image Sensors and Peripheral Integrated Circuits".

The picture pick-up device of FIG. 1 also includes an electronic shutter in order to achieve that the integration is effectively performed during a variable part of the maximum available picture information integration period of performing just before this period a resetting to a reference at the picture pick-up member PP. It is assumed that the start of the variable part of the period occurs at the instant when the state shown at the storage member MP is present, with the part MP2 containing no information and the part MP1 containing information. Advancement or delay of the resetting corresponds to a diminution or magnification, respectively, of the part MP2 and a magnification or diminution, respectively, of the part MP1. In the absence of the part MP2 the maximum available picture information integration period is entirely utilized and the electronic shutter is controlled up to its maximum opening time. In the case of a maximum presence of the part MP2 the electronic shutter is controlled down it its minimum opening time. For both states it holds that the electronic shutter is effectively rendered inoperative at the maximum and minimum shutter opening times, respectively. The parts MP1 and MP2 are only shown in the FIG. for the purpose of illustrating the electronic shutter action with respect to time.

Figure 2:
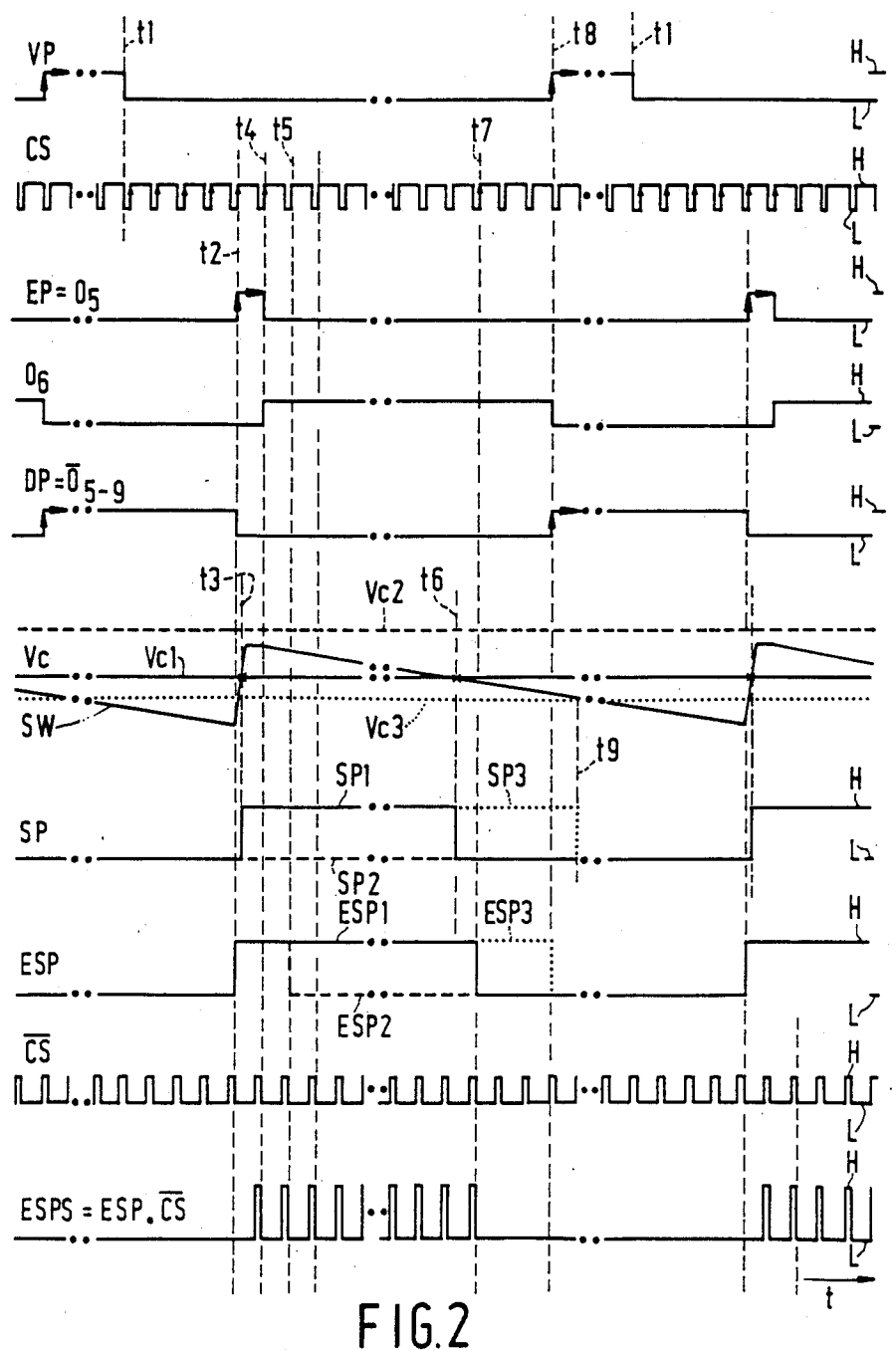
FIG. 2 shows signal diagrams as a function of time to illustrate the operation of the device according to FIG. 1

In order to realise that the picture pick-up device according to FIG. 1 operates with an electronic shutter which is further utilized for a correction of the smear before integration at the sensor FT, the further components of the control circuit of FIG. 1 have been shown as examples. The reference JC denotes a pulse counting circuit which has two inputs for the respective supply of a signal VP and a signal CS from the generator GEN via identically denoted terminals. FIG. 2 shows as a function of time t time diagrams of the signals VP and CS as well as of signals to be further indicated. At several signals the reference H denotes a high signal value and L denotes a low signal value. The signal VP is a field synchronizing signal with two instants t1 shown indicating the start and the end of a field period. Further instants are denoted by t2 to t9 in FIG. 2. The signal CS is a line-frequency clock pulse signal and, as is shown, it may be a line synchronizing signal A line period is present between the indicated instants t4 and t5. The duration of the falling pulses is, for example, between the duration of standardised line synchronising pulses and line blanking pulses. In any case they have a duration falling within the line blanking period. Likewise, the pulse between the instants t8 and t1 in the field synchronising signal VP occurs within the field blanking period. The circuit JC which operates as a field-synchronised line-frequency pulse counting circuit is shown with two outputs for the respective supply of a signal EP and a signal DP. The signal EP operates as a start signal and is shown in FIG. 2 with a single pulse per field period having the duration of one line period as occurs between the instants t2 and t4. The signal DP is active as an end signal and is shown as a square-wave signal in FIG. 2, the instant t8 being an end instant. In this respect start and end refer to starting the electronic shutter and stopping the electronic shutter, respectively, at the last possible instant per field period, which corresponds to the minimum shutter opening time.

Figure 3:
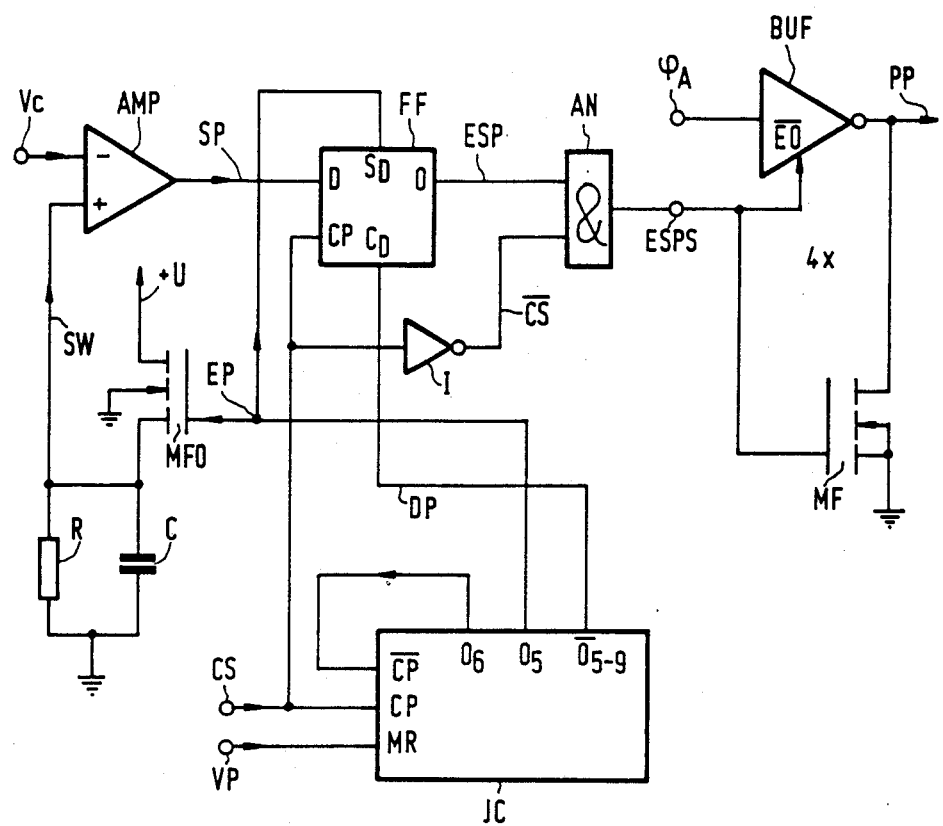
FIG. 3 shows a more detailed circuit of components of the device of FIG. 1 with which also the signal diagrams of FIG. 2 are associated.

Both signals EP and DP are applied to inputs of a flip-flop circuit FF the detailed structure of which is shown in FIG. 3, which also applies to the pulse counting circuit JC. FIG. 3 shows that the start signal EP is applied to an (overriding) set-direct input $S_D$ of the flip-flop circuit FF which is of the D-type as is evident from the D notation at a data input. A clock input is denoted by CP and the line-frequency clock pulse signal CS is applied thereto. The end signal DP is applied to an (overriding) clear-direct input $C_D$ of the flip-flop circuit FF. It is stated that in the case of supply of a signal having a given value to an overriding input, the flip-flop circuit FF assumes a state which cannot be changed by the supply of the clock pulse signal CS to the clock input CP. In FIG. 2 the overriding character is indicated by vertical and horizontal arrow heads at the instant t2 at the signal EP and at the instant t8 at the signal DP. FIG. 3 shows that one output denoted by O of the flip-flop circuit FF is utilized for signal supply. It is assumed that at a low signal value L at the inputs $S_D$ and $C_D$, that is to say, the enable state with $S_D=L$ and $C_D=L$, the output O takes over the low L or highH signal value present at the D input in the case of rising clock pulse edges if this values is not already present at the output O. For the overriding state it further holds that O=H at $S_D=H$ and $C_D=L$, O=L at $S_D=L$ and $C_D=H$ and O=H at $S_D=H$ and $C_D=H$.

FIG. 3 shows in detail that the pulse counting circuit JC is in the form of a Johnson counter. The field synchronizing signal VP is supplied to an (overriding) master reset input MR. The line-frequency clock pulse signal CS is applied is applied to a clock input CP via which the counting circuit JC can react to rising clock pulse edges (L to H triggered). In FIG. 2 clock pulse edges of the signal CS to which the counting circuit JC reacts have been denoted by a vertical arrow head. FIG. 3 shows that the signal EP originates from a decoded output $O_5$ which is emphasized in FIG. 2 by means of the notation $EP=O_5$. The signal DP is supplied by a cazzy output $O_{6-9}$ which is illustrated in FIG. 2 by means of the notation $DP=\overline{O}_{5-9}$. FIG. 3 also shows that a decoded output $O_6$ is connected to a clock input $\overline{CP}$ of the counting circuit JC via which input this circuit reacts to falling clock pulse edges (H to L triggered). Furthermore it holds that the counting circuit JC only reacts to rising clock pulse edges at the input CP and reacts to falling clock pulse edges at the input $\overline{CP}$, respectively if the inputs $\overline{CP}$ and CP have a low signal value L and a high signal value L and a high signal value H, respectively, in the presence of a low signal value L at the master reset input MR. In the reset state with MR=H it holds that $O_5=L$, $O_6=L$ and $\overline{O}_{5-9}=H$. For further details of the counting circuit JC and the flip-flop circuit FF reference is made to information in the Philips Handbooks on the 5-stage Johnson counter HEF 4017 and the dual D-type flip-flop HEF 4013, respectively.

The following holds for explaining the generation of the signals EP and DP by the counting circuit JC. The starting point in FIG. 2 is a state just before the instant t1 for which it holds that VP=MR=H, $EP=O_5=L$, $O_6=L$ and $\overline{O}_{5-9}=H$ independent of the clock pulse signal supply at the input CP. At the instant t1 the field synchronising signal VP acquires the low value L and from this instant t1 it holds that MR=L. Since it holds that $O_6=\overline{CP}=L$, the output $O_5$ will assume the value H at the fifth rising pulse edge as is shown at the instant t2 in FIG. 2. By internal coupling in the counting circuit JC the output $\overline{O}_{5-9}$ assumes the value L. At the sixth rising clock pulse edge at the instant t4 the output $O_6$ assumes the value H, whilst the output $O_5$ returns to the value L. From the instant t4 it holds that $O_6=\overline{CP}=H$ so that the clock pulses at the input CP can no longer influence the counting circuit JC; the counting circuit JC stops. The counting circuit JC thus blocked remains blocked until it is reset at the instant t8 by the signal VP for which it holds that VP=MR=H. This overriding reset is illustrated by means of the vertical and horizontal arrow head at the signal VP in FIG. 2. The initial state, namely the state just before the instant t1, is associated therewith.

The supply of the signal EP to the overriding set input $S_D$ of the flip-flop circuit FF of FIG. 3 results, at $EP=O_5=S_D=H$, in ESP=H for the output O with a signal ESP at this output. This state remains as long as $EP=O_5=S_D=H$. FIG. 2 shows that from the instant t4 $EP=O_5=S_D=L$ while furthermore it holds that $DP=\overline{O}_{5-9}=C_D=L$. At the next instant t5 a rising clock pulse edge occurs in the signal CS at the input CP of the D-type flipflop circuit FF so that the output O takes over the value at the D input if this value is not already present at this input. If it is assumed that for a signal SP shown in FIG. 2 at the D input it holds at the instant t5 that SP=D=SP2=L, the signal ESP will have a variation as is shown in FIG. 2 from the instant t5 by ESP=ESP2. If SP=D=SP1=H at the instant t5, the signal variation ESP=ESP1 of the instant t5 occurs.

The signal variation SP=SP1 of FIG. 2 is obtained by means of a sawtooth generator MFRC and a signal comparison circuit AMP as is shown in FIG. 1 and in greater detail in FIG. 3 with a MOSFET transistor MFO, a resistor R, a capacitor C and a differential amplifier AMP as a signal comparison circuit. Due to the supply of the start signal EP to the generator MFRC, it operates as a field-frequency sawtooth generator. According to FIG. 3 the signal EP is applied to gate electrode of the n-channel transistor MFO whose drain electrode is connected to a positive supply voltage terminal +U which forms part of a voltage source which is further not shown and another terminal of which is considered to be connected to ground. The substrate of the transistor MFO is connected to ground and the source electrode is connected to ground via a parallel arrangement of the resistor R and the capacitor C. A sawtooth signal SW an idealised linear variation of which is shown in FIG. 2 occurs at the junction point of the transistor MFO, the resistor R and the capacitor C. The transistor MFO is turned on between the instants t2 and t4 and the capacitor C is charged to the voltage $+U$ whereafter it is discharged across the resistor R. The sawtooth signal SW is applied to a $(+)$ input of the differential amplifier AMP of FIG. 3 in which a $(-)$ input receives the control voltage Vc which, according to FIG. 1, originates from the picture signal processing circuit PROC. For the explanation of the operation of the picture pick-up device FIG. 2 shows three values of the control voltage Vc denoted by Vc1, Vc2, and Vc3. The differential amplifier AMP supplies a signal SP with three different signal variations which are denoted by SP1, SP2 and SP3 in FIG. 2. When the control voltage Vc1 occurs, the sawtooth SW passes this control voltage at the instant t3 so that the rising pulse edge occurs in the signal SP. At the instant t6 there is a passage in the reverse direction with the falling pulse edge occurring in the signal SP which is applied to the D input of the flip-flop circuit FF. It appears that the instants t3 and t6 may occur at an arbitrary moment dependent on the sawtooth-shaped voltage variation and the value of the control voltage. As already described, the rising pulse edge in the signal ESP occurs at the instant t2, which is fixed by the signal EP. The instant t2 is fixed at the field and line frequency via the signals VP and CS. In order to achieve that the falling pulse edge in the signal ESP is also fixed at the field and line frequency, the flipflop circuit FF is used because the flip-flop circuit FF flips over from the value H to the value L at the output O after the falling pulse edge in the signal SP at the next rising pulse edge of the signal CS at the instant t7. For the signal variation SP1 a signal variation ESP1 follows. The output O conveying the signal ESP is connected to an input of a coincidence circuit AN shown as an AND gate. The signal CS is applied to another input of the circuit AN via an inverter circuit I so that a signal $\overline{CS}$ is operative at this input. The line-frequency clock pulse signal $\overline{CS}$ is shown by way of example in FIG. 2 as an inverted line synchronising signal. The output of the circuit AN supplies a signal ESPS in accordance with the logic AND relation as is indicated in FIG. 2 by ESPS-ESP.$\overline{CS}$. FIG. 2 shows that for the signal variation ESP1 the shown series of pulses occurs in the signal ESPS. The signal ESPS of FIG. 2 which occurs at the identically denoted terminals in FIGS. 1 and 3, respectively, is generated by a pulse generator which may be essentially indicated by (JC, FF, AN, I). The field and line synchronisation of the pulse edges is further illustrated in FIG. 1 in the block of the flip-flop circuit FF, whilst a series of line frequency pulses amounting to two is illustrated in the block of the circuit AN.

According to FIG. 1 the output terminal ESPS of the pulse generator (JC, FF, AN, I) conveying the series of pulses is coupled to an output-enable-input of buffer circuits BUF1 to BUF4 and to a switching input of on-off switches MF1 to MF4. FIG. 3 shows a more detailed embodiment of the four buffer circuits BUF and the on-off switches in the form of MOSFET transistors MF. The transistor MF of FIG. 3 is of the n-channel type, whose source electrode and the substrate are connected to ground and whose drain electrode is connected to the output of the buffer circuit BUF which is further coupled to the pick-up member PP of the sensor FT of FIG. 1. The gate electrode of the transistor MF of FIG. 3 is connected to the output-enable-input denoted by $\overline{EO}$ of the buffer circuit BUF. An input of the buffer circuit BUF of FIG. 3 receives the clock pulse signal $\phi_A$ which is shown in greater detail in FIG. 1 as a four-phase signal denoted by $\phi_{1A}$, $\phi_{2A}$, $\phi_{3A}$ and $\phi_{4A}$. The buffer circuits BUF may form part of, for example, an integrated circuit HEF 40240 comprising eight buffers with 3-state outputs. At a high value H in the signal ESPS the output of the buffer circuit BUF has a high impedance off-state and at a value L the buffer circuit UBUF is enabled and operates as an inverter circuit for the clock pulse signal $\phi_A$. During the switched-off state of the buffer circuits BUF the transistors MF are turned on so that the ground potential is impressed as a reference voltage on all clock pulse control electrodes at the pick-up member PP of the sensor FT of FIG. 1. Co A conducting connection is then present between each of the pick-up elements P in the pick-up member PP and the substrate of the sensor FT, which implies a line frequency reset at the picture information integration effected during line blanking periods. Thus, the picture pick-up device operates with an electronic shutter which is denoted by (ESPS, UBUF, MF, $\phi_A$). In FIG. 2 the series of reset pulses in the signal ESPS illustrates that this signal operates with an electronic shutter pulse series. The buffer circuits BUF and the on-off pulse series. The buffer circuits BUF and the on-off switches MF in the form of transistors are jointly operative as a gating circuit with a logic NOR-relation for the clock pulse signals $\phi_A$ and the signal ESPS. In fact, at ESPS=H it holds that PP=L and at ESPS=L it holds that PP=$\phi_A$.

The series of reset pulses in the signal ESPS shown in FIG. 2 is associated with the control voltage value Vc1. The signal variation SP1 at the signal SP fixes the variable part of the period with the periodical resetting. If there were a control voltage value Vc2, the sawtooth SW would not pass this value. The signal variation SP2 then occurs in the signal SP and without further measures there would be no pulse in the signal ESP. In order to realise that, according to the invention, the flip-flop circuit FF does provide for a minimum number of reset pulses in the signal ESPS, the signal EP is applied to the overriding set input $S_D$ of the flip-flop circuit FF. In the example shown the pulse generator (JC, FF, AN,I) always supplies a minimum number of two reset pulses in the signal ESPS via the signal variation ESP2, independent of the duration of the variable part of the period with the periodical resetting. These pulses occur before the instants t4 and t5. The electronic shutter (ESPS, BUF, MF, $\phi_A$) acquires the described correction of the smear before integration as its second function at the frame transfer sensor FT. The minimum number of two reset pulses is shown as an example in the signal ESPS.

In another case a control voltage value Vc3 may be present. The sawtooth SW passes the control voltage value Vc3 at the instant t9. A signal variation SP3 occurs in the signal SP. The instant t9 is after the instant t8 and could fall within the described information frame transfer period. The electronic shutter (ESPS, BUF, MF, $\phi_A$) has no longer any effective opening period. To realise that the pulse generator (JC, FF, AN, I) for supplying the minimum number of reset pulses in the signal ESPS further supplies a maximum number which occurs in a period which is shorter than the maximum available picture information integration period minus the frame transfer period, the signal DP is applied to the overriding clear input $C_D$ of the flip-flop circuit FF of FIG. 3. The rising pulse edge at the instant t8 in the signal DP of FIG. 2 gives a signal variation ESP3 in the signal ESP. This ensures that there is a minimum shutter opening period, namely from the instant t8 to the instant of commencement of the frame transfer period which falls between the instants t8 and t1. It appears that the electronic shutter (ESPS, BUF, MF, $\phi_A$) has a maximum opening period between the instant t5 and the instant t8 and this is the maximum available picture information integration period. The variable part of the period with the periodical resetting is obtained by extending the resetting at the picture pick-up member PP after the instant t5 in dependence upon the control voltage Vc.

It is stated by way of example that the duration between the instants t8 and t1 is equal to ten line periods, with the frame transfer period covering approximately seven line periods, for example, directly before the instant t1. In this case there is a minimum shutter opening period of approximately three line periods. Assuming that there are n line periods per field period between the periodical instants t1, then it follows by means of FIG. 2 that there is a maximum shutter opening period, or in other words the maximum available picture information integration period at the picture pick-up member PP of the sensor FT of n minus approximately thirteen line periods, namely approximately seven line periods before the instant t1 and approximately six line periods after the instant t1. The said thirteen line periods occur in the field blanking period which lasts, for example twenty-five or twenty-one line periods. The theoretically maximum available picture information integration period is equal to n line periods minus approximately seven line periods for the information frame transfer period.

What is claimed is:

1. A picture pick-up device including a solid-state sensor and an electronic shutter, which sensor comprises a picture pick-up member including a matrix of picture pick-up elements, a storage member coupled to said picture pick-up member, said storage member including a matrix of storage elements, and a parallel-in, series-out shift register member coupled to said matrix of storage elements, said parallel-in, series-out shift register member including at least one row of shift register elements which is coupled to a picture signal output of the sensor for supplying a picture signal occurring at line scanning periods, line blanking periods, field scanning periods and field blanking periods, said sensor to this end being coupled to a control circuit for supplying control signals for obtaining, after an effective picture information integration period at the pick-up member, a parallel information frame transfer effected in a frame transfer period from the picture pick-up member to the storage member during a field blanking period and for subsequently obtaining a periodically occurring parallel information shift effected during a line blanking period from the storage member to the shift register member in which a serial information shift to the picture signal output is subsequently effected during a line scanning period, the electronic shutter operating with a periodical resetting during a variable part of the maximum available picture information integration period at the picture pick-up member with the aid of a series of reset pulses occurring during line blanking periods and to be supplied by a pulse generator which is present in the control circuit, characterized in that said pulse generator is adapted to supply a maximum number of reset pulses, which maximum number occurs in a period which is shorter than the maximum available picture information integration period minus the frame transfer period, said maximum number being greater than or equal to a minimum number regardless of the duration of the variable part with the periodical resetting of the period.

2. A picture pick-up device as claimed in claim 1, in which the control circuit is formed with a field-frequency sawtooth generator an output of which is coupled to an input of a signal comparison circuit having another input for the supply of a control voltage determining the effective picture information integration period and having an output coupled to an input of said pulse generator for supplying the series of reset pulses, characterized in that the pulse generator includes a flipflop circuit having a data input which is coupled to an output of the said signal comparison circuit, a clock input for the supply of a first line-frequency clock pulse signal and an overriding set input which is coupled to an output of a field-synchronised line-frequency pulse counting circuit, an output of the flip-flop circuit being coupled to an input of a coincidence circuit having another input for the supply of a second line-frequency clock pulse signal and an output for the supply of the said series of reset pulses.

3. A picture pick-up device as claimed in claim 2, characterized in that the flip-flop circuit has an overriding clear input which is coupled to an output of the field-synchronised line-frequency pulse counting circuit.

4. A picture pick-up device as claimed in claim 3 in which the control circuit includes a time signal generator having outputs for the supply of clock pulse signals, which outputs are coupled via a gating circuit to the picture pick-up member of the sensor and an input of the gating circuit is coupled to an output of the pulse generator for the supply of the series of reset pulses, characterized in that the gating circuit includes a buffer circuit for each gating input and output for the clock pulse signals, which buffer circuits are blocked under the control of the series of reset pulses during line blanking periods, whilst simultaneously the output of each buffer circuit is connected via an on-off switch to a reference voltage for the resetting at the picture pick-up member of the sensor.

5. A picture pick-up device as claimed in claim 2 in which the control circuit includes a time signal generator having outputs for the supply of clock pulse signals, which outputs are coupled via a gating circuit to the picture pick-up member of the sensor and an input of the gating circuit is coupled to an output of the pulse generator for the supply of the series of reset pulses, characterized in that the gating circuit includes a buffer circuit for each gating input and output for the clock pulse signals, which buffer circuits are blocked under the control of the series of reset pulses during line blanking periods, whilst simultaneously the output of each buffer circuit is connected via an on-off switch to a reference voltage for the resetting at the picture pick-up member of the sensor.

6. A picture pick-up device as claimed in claim 1 in which the control circuit includes a time signal generator having outputs for the supply of clock pulse signals, which outputs are coupled via a gating circuit to the picture pick-up member of the sensor and an input of the gating circuit is coupled to an output of the pulse generator for the supply of the series of reset pulses, characterized in that the gating circuit includes a buffer circuit for each gating input and output for the clock pulse signals, which buffer circuits are blocked under the control of the series of reset pulses during line blanking periods, whilst simultaneously the output of each buffer circuit is connected via an on-off switch to a reference voltage for the resetting at the picture pick-up member of the sensor.

* * * * *